United States Patent Office 3,136,763
Patented June 9, 1964

3,136,763
3,5-DISUBSTITUTED-TETRAHYDRO-4H-1,3,5-OXADIAZIN-4-ONES
Allan A. Eisenbraun, Colonial Heights, Va., assignor to Allied Chemical Corporation, New York, N.Y., a corporation of New York
No Drawing. Filed Feb. 27, 1962, Ser. No. 176,136
13 Claims. (Cl. 260—244)

This invention relates to 3,5-disubstituted-tetrahydro-4H-1,3,5-oxadiazin-4-ones, also known as 3,5-disubstituted urons, and more particularly refers to a new and improved process for the production of 3,5-disubstituted-tetrahydro-4H-1,3,5-oxadiazin-4-ones.

3,5-disubstituted urons have been prepared by the action of excess aqueous formaldehyde on 1,3-dialkyl-urea employing barium hydroxide, followed by the treatment of the reaction product with methanol and aqueous hydrochloric acid. Conventional procedure for producing the 3,5-disubstituted urons unfortunately is unsatisfactory, particularly for large scale commercial production because of relatively low yields, requirement of a solvent or diluent medium which not only necessitates large size equipment but also complicates separation of the desired product, and low reaction rates, all of which make the preparation of urons expensive and time-consuming.

3,5-disubstituted uron monomers are highly active compounds of varying characteristics and some readily form polymers which are useful as moulding products and are particularly adapted for being drawn into fibers of considerable strength. 3,5-dibutyluron, when produced according to the process of the present invention and a new compound, is particularly suitable for use as a mold growth inhibitor.

An object of the present invention is to provide a process for preparing 3,5-disubstituted urons, which process is substantially free of the objections of the heretofore known procedures, particularly with respect to yields, reaction rates and diluent medium. Other objects and advantages will be apparent from the following description.

In accordance with the present invention 3,5-disubstituted-tetrahydro 4H-1,3,5-oxadiazin-4-ones may be prepared in an efficient economical manner in high yield in excess of 80–90 percent, by heating 1,3-disubstituted urea and paraformaldehyde in the proportion of one mol 1,3-disubstituted urea to at least two mols of $CH_2O$ groups available in the paraformaldehyde, preferably 2.1–3.5 mols of $CH_2O$ groups, and maintaining the reaction mixture at a temperature within the range of about 70–200° C., preferably 90–150° C., for a sufficient length of time, generally about ½ hour to 3 hours, to effect substantially complete conversion of the 1,3-disubstituted urea and paraformaldehyde to 3,5-disubstituted-tetrahydro-4H-1,3,5-oxadiazin-4-ones, i.e. yields in excess of 80 percent.

Further, although the reaction will proceed in the absence of a catalyst, the addition of a weak acid catalyst having an ionization constant of $10^{-5}$ or less, preferably boric acid, facilitates the reaction and improves the yield.

The 1,3-disubstituted urea reactant may be any urea compound in which the hydrogens on the 1 and 3 positions are substituted by groups which are non-reactive to paraformaldehyde under the conditions of reaction. Illustrative of such non-reactive groups are alkyl groups, preferably alkyl groups having from 2 to 6 carbon atoms, alkene groups, preferably alkene groups having from 2 to 6 carbon atoms, carboalkoxy alkyl groups having 1 to 5 carbon atoms in the alkoxy groups and 1 to 5 carbon atoms in the alkyl groups, cycloaliphatic groups, and arylene groups. Merely as illustrative the groups may be $C_2H_5-$, $C_3H_7-$, $C_4H_9-$, $C_5H_{11}-$, $C_2H_3-$, $C_3H_5-$, $C_4H_7-$, $C_5H_9-$, $-(CH_2)_2COOC_2H_5$ and $-(CH_2)_3COOC_2H_5$. The 1,3-disubstituted urea need not be symmetrical, that is both groups need not be alike but may be different i.e. unsymmetrical disubstituted urea.

Paraformaldehyde $(CH_2O)_n$ includes other formaldehyde polymers such as trioxymethylene which will decompose to formaldehyde at the desired reaction temperatures. Aqueous formaldehyde should be avoided since it was found that under the process conditions the reaction proceeded slowly, the yields were poor with considerable by-product formation, the operation was costly requiring large equipment, and purification problems complicated the difficulties.

In the course of my investigation I tested various acids, including sulfuric and hydrochloric acid, but found that such strong acids tend to cleave the uron ring, which of course destroyed the desired product; volatile acids such as acetic acid tend to vaporize from the reaction mixture at advanced reaction temperatures and are not as effective as non-volatile acids. If however, I employed as an acid catalyst a weak acid having an ionization constant of $10^{-5}$ or less, the reaction was facilitated, there was no cleavage of the uron ring and the yields were improved. Examples of weak acids having an ionization constant below $10^{-5}$ are arsenious ($HAsO_2$), boric ($H_3BO_3$) and hydrocyanic (HCN) acids. Boric acid, the preferred acid catalyst, is a readily available low cost acid and consistently gave good results in the operation. The amount of acid catalyst may be varied over a range, generally the addition of about 0.2 to 0.5 mol of catalyst per mol of disubstituted urea gave satisfactory results.

As illustrative the reaction proceeds according to the equation:

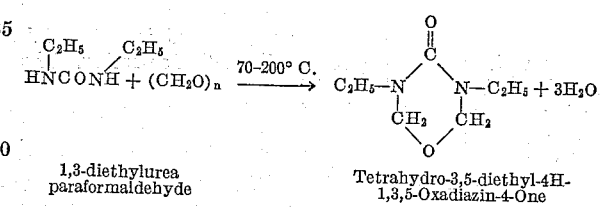

1,3-diethylurea
paraformaldehyde

Tetrahydro-3,5-diethyl-4H-1,3,5-Oxadiazin-4-One

The reaction may be simply and conveniently carried out by introducing the 1,3-disubstituted urea and paraformaldehyde into a reaction vessel provided with a suitable heating means such as a heating jacket surrounding the reaction vessel, through which a heating medium flows, or an internal heating coil, and heating the reaction mixture to a temperature to above 70° but below 200° C. to initiate reaction and maintain the reactants at that temperature within that range until the reaction is complete. The application of pressure is unnecessary and this obviates the use of high pressure equipment. Indeed the reaction vessel if desired may be open to the atmosphere. A considerable variation of heating time and temperatures may be used with the reaction time being shorter at the higher temperatures within the range. The reaction is completed in a relatively short time, generally within ½ hour to several hours depending on the reaction temperature. The termination of the reaction can easily be ascertained by observing when water is no longer given off by the reaction mixture, and it is desirable to discontinue the reaction when water ceases to evolve. When an open type of reaction vessel is used, water liberated in the reaction may be released to the atmosphere. The resulting 3,5-disubstituted-tetrahydro-4H-1,3,5-oxadiazin-4-ones is in a fairly pure state and may be employed without further purification where the small amounts of impurities do not interfere with subsequent use, or if a more purified product is desired, then 3,5-disubstituted-tetrahydro-4H-1,3,5-oxadiazin - 4 - ones may be isolated from the reaction mixture by any suitable procedure such as distillation or crystallization.

The following examples illustrate the present invention. Examples 1–3 are directed to the preparation of 3,5-disubstituted urons and Examples 4 and 5 are directed to polymers prepared from disubstituted urons. Example 6 shows the use of 3,5-dibutyluron as a mold growth inhibitor.

EXAMPLE 1

*Preparation of Tetrahydro-3,5-Dibutyl-4H-1,3,5-Oxadiazin-4-One*

21 grams of paraformaldehyde (97.5%) and 42.1 grams of 1,3-dibutylurea were mixed and placed in a 200 ml. flask, which was connected to a distillation assembly. The flask was then heated in an oil bath at 125° C. over a period of 3½ hours. The temperature of the reaction mixture rose from room temperature (25° C.) to 105° C. during the first 1½ hours of heating, and it remained at 105 to 124° C. during the last 2 hours of the heating period. The water formed during the reaction and the excess formaldehyde distilled off during that period. The crude product was purified by distillation under reduced pressure. The tetrahydro-3,5-dibutyl-4H-1,3,5-oxadiazin-4-one distilled at 90–109° C./0.04–0.20 mm. Hg. Yield: 49.3 grams or 94.4%. The product had a refractive index of $n_D{}^{27}=1.4678$. An analysis of the recovered product showed a carbon content of 61.89% compared with a theoretical of 61.65%; a hydrogen content of 10.50% compared with a theoretical of 10.35%; and a nitrogen content of 12.88% compared with a theoretical of 13.07%.

EXAMPLE 2

*Preparation of Tetrahydro-3,5-Bis(Carbethoxymethyl)-4H-1,3,5-Oxadizin-4-One*

45 grams of paraformaldehyde (97.5%), 116 grams of 1,3-dicarbethoxymethylurea and 10 grams of boric acid were mixed and the mixture was placed in a 300 ml. flask, which was connected to a distillation assembly. The flask was immersed in an oil bath at 125° C. over a period of 2 hours. During this time the temperature of the reaction mixture rose from room temperature to 120° C. Water formed in the reaction and excess formaldehyde distilled off during this period. The crude reaction mixture, 152.0 grams, was allowed to cool and was then slurried with 130 grams of 2% aqueous ammonia. The crystalline material was isolated by filtration, slurried in 40 grams of water, again collected by filtration and dried under reduced pressure. 104.2 grams of a product identified as tetrahydro-3,5-bis(carbethoxymethyl)uron was recovered which melted at 84–85° C. An additional 7.7 grams, melting at the same temperature, was recovered by evaporation of the mother liquor. The combined yield was 111.9 grams or 82%. An analysis of the recovered product showed a carbon content of 47.89%, compared with a theoretical of 48.15%; a hydrogen content of 6.68%, compared with a theoretical of 6.62%; and a nitrogen content of 10.11%, compared with a theoretical of 10.22%.

EXAMPLE 3

*Preparation of Tetrahydro-3,5-Bis(Carbomethoxypentyl)-4H-1,3,5-Oxadiazin-4-One*

4.9 grams paraformaldehyde (97.5%), 15.8 grams 1,3-dicarbomethoxypentylurea and 1.0 gram boric acid were mixed and the mixture was placed in a 100 ml. flask, which was connected to a distillation assembly. The flask was immersed in an oil bath at 127–130° C. over a period of 40 minutes. The reaction was discontinued when the reaction mixture reached 120° C. Water and excess formaldehyde distilled off during this period. The reaction mixture, 19.3 grams, crystallized upon cooling. The mixture was dissolved in 11.06 grams of hot methanol and poured into a mixture of 100 grams crushed ice and 50 grams water under vigorous mechanical agitation. The crystals were collected by filtration, washed with 20 grams of water, and dried under reduced pressure. 15.9 grams of the recovered product identified as tetrahydro-3,5-bis(carbomethoxypentyl)-4H-1,3,5-oxadiazin-4-one melted at 54–55° C. The yield was 89% of theory. An additional recrystallization from aqueous methanol increased the melting point to 58° C. An analysis of the recovered product showed a carbon content of 57.37% compared with a theoretical of 56.96%; a hydrogen content of 8.63% compared with a theoretical of 8.44%; and a nitrogen content of 7.51% compared with a theoretical of 7.82%.

EXAMPLE 4

*Poly[Butylene-3,5-Bis(Carbethoxymethyl)Uron]*

A dispersion of catalyst consisting of 0.022 gram of lithium hydride, 0.005 gram of zinc acetate dihydrate, and 0.003 gram of antimony trioxide in 2.534 grams (0.0281 mol) of freshly distilled butanediol-1,4 (boiling point 197–198° C.) was prepared. This dispersion and 6.84 grams of 3,5-biscarbethoxymethyluron (0.025 mol) were placed in an ampoule, which was equipped with a nitrogen inlet tube and side arm. The mixture was heated for 16 hours at 150° C. while allowing nitrogen to bubble through. 1.71 grams ethanol (or 72% of theory) was collected in a receiver. The product, a slightly yellow, sticky mass, melted at 90–96° C. The free hydroxy number was $1.3 \times 10^{-3}$ mol/gram and the acid number was practically absent. These values corresponded to a molecular weight of 1500. Heating at 180° C. and under a pressure of 0.05 mm. Hg for 3 hours increased the melting point of the polymer to 145° C. The product may be used as a hot-melt adhesive; it is simply applied to the surfaces of the substances to be adhered and then heated to effect bonding.

EXAMPLE 5

*Poly[Hexamethylene-3,5-Bis(Carbamidopentyl)Uron]*

1.536 grams of hexamethylene diamine (0.01321 mol), and 4.622 grams of 3,5 - biscarbomethoxypentyluron (0.0128 mol), were placed in an ampoule. The ampoule was flushed with nitrogen and sealed under pressure of 0.3 mm. Hg. The mixture was heated for 18 hours at 165° C. The ampoule was then equipped with a side arm and nitrogen inlet tube. Heating was continued while bubbling nitrogen through the molten mixture. The mixture was slowly heated under atmospheric pressure to a temperature of 205° C. over a period of 2 hours. Methanol was evolved during this heating step and was identified by refractive index. After this time fibers having considerable strength could be drawn from the melt.

EXAMPLE 6

*Use of 3,5-Dibutyluron as Mold Growth Inhibitor*

In 900 ml. of hot water were dissolved 2 grams of sodium nitrite, 0.5 gram of potassium chloride, 0.5 gram of magnesium sulfate, 0.01 gram of ferrous sulfate, 1 gram of monopotassium phosphate, 7 grams of Agar-Agar and 30 grams of sucrose. The solution was then diluted to 1000 ml. volume and filled into several culture plates. Small amounts of 3,5-dibutyluron were added to these culture plates. The plates were innoculated with a mixture of molds, including *Aspergillus niger* and left for a period of two weeks at a temperature of 25° C. Results are shown below:

Culture medium containing 2%
   of 3,5-dibutyluron _____ No growth of molds after 2 weeks.

Culture medium containing 0.5%
   of 3,5-dibutyluron _____ No growth of molds after 2 weeks.

Culture medium containing no
   3,5-dibutyluron _____ Abundant growth of molds after 2 weeks.

Although certain preferred embodiments of the invention have been disclosed for purpose of illustration, it will be evident that various changes and modifications may be made therein without departing from the scope and spirit of the invention.

I claim:

1. A process for the production of 3,5-disubstituted-tetrahydro-4H-1,3,5-oxadiazin-4-one of the formula

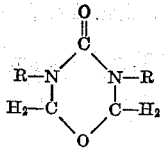

wherein R is a member selected from the group consisting of alkyl of from 2 to 6 carbon atoms, alkenyl of 2 to 6 carbon atoms, carboalkoxy alkyl of 1 to 5 carbon atoms in the alkoxy constituent and 1 to 5 carbon atoms in the alkyl constituent which comprises maintaining a 1,3-disubstituted urea of the formula

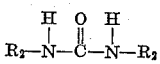

wherein $R_2$ is a member selected from the group consisting of alkyl of 2 to 6 carbon atoms, alkenyl of 2 to 6 carbon atoms, carboalkoxy alkyl of 1 to 5 carbon atoms in the alkoxy constituent and 1 to 5 carbon atoms in the alkyl constituent and paraformaldehyde at a temperature within the range of about 70–200° C. for a sufficient length of time to effect conversion of the 1,3-disubstituted urea and paraformaldehyde.

2. A process for the production of 3,5-disubstituted-tetrahydro-4H-1,3,5-oxadiazin-4-one of the formula

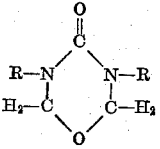

wherein R is a member selected from the group consisting of alkyl of 2 to 6 carbon atoms, alkenyl of 2 to 6 carbon atoms, carboalkoxy alkyl having 1 to 5 carbon atoms in the alkoxy constituent and 1 to 5 carbon atoms in the alkyl constituent which comprises maintaining a 1,3-disubstituted urea of the formula

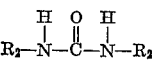

wherein $R_2$ is a member selected from the group consisting of alkyl of 2 to 6 carbon atoms, alkenyl of 2 to 6 carbon atoms, carboalkoxy alkyl of 1 to 5 carbon atoms in the alkyl constituent and paraformaldehyde in the presence of a weak acid catalyst having an ionization constant of less than $10^{-5}$ at a temperature within the range of about 70–200° C. for a sufficient length of time to effect conversion of the 1,3-disubstituted urea and paraformaldehyde.

3. A process as claimed in claim 2, wherein the weak acid catalyst is boric acid.

4. A process for the production of 3,5-disubstituted-tetrahydro-4H-1,3,5-oxadiazin-4-one of the formula

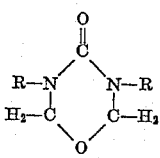

wherein R is a member selected from the group consisting of alkyl of 2 to 6 carbon atoms, alkenyl of 2 to 6 carbon atoms, carboalkoxy alkyl of 1 to 5 carbon atoms in the alkoxy constituent and 1 to 5 carbon atoms in the alkyl constituent which comprises maintaining a 1,3-disubstituted urea of the formula

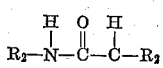

wherein $R_2$ is a member selected from the group consisting of alkyl of 2 to 6 carbon atoms, alkenyl of from 2 to 6 carbon atoms, carboalkoxy alkyl of 1 to 5 carbon atoms in the alkoxy constitutent and 1 to 5 carbon atoms in the alkyl constituent and paraformaldehyde in the proportion of one mol 1,3-disubstituted urea to 2.1–3.5 mols of $CH_2O$ groups available in the paraformaldehyde at a temperature within the range of about 90–150° C. for a sufficient length of time to effect conversion of the 1,3-disubstituted urea and paraformaldehyde.

5. A process for the production of tetrahydro-3,5-dialkyl-4H-1,3,5-oxadiazin-4-one which comprises maintaining 1,3-dialkyl urea and paraformaldehyde at a temperature within the range of about 70–200° C. for a sufficient length of time to effect conversion of the 1,3-dialkyl urea and paraformaldehyde to tetrahydro-3,5-dialkyl-4H-1,3,5-oxadiazin-4-one.

6. A process for the production of tetrahydro-3,5-dialkene-4H-1,3,5-oxadiazin-4-one which comprises maintaining 1,3-dialkene urea and paraformaldehyde at a temperature within the range of about 70–200° C. for a sufficient length of time to effect conversion of the 1,3-dialkene urea and paraformaldehyde to tetrahydro-3,5-dialkene-4H-1,3,5-oxadiazin-4-one.

7. A process for the production of tetrahydro-3,5-dicarboalkoxyalkyl - 4H - 1,3,5 - oxadiazin - 4 - one which comprises maintaining 1,3-dicarboalkoxyalkyl urea and paraformaldehyde at a temperature within the range of about 70–200° C. for a sufficient length of time to effect conversion of the 1,3-dicarboalkoxyalkyl urea and paraformaldehyde to tetrahydro-3,5-dicarboalkoxyalkyl-4H-1,3,5-oxadiazin-4-one.

8. A process for the production of tetrahydro-3,5-dibutyl-4H-1,3,5-oxadiazin-4-one which comprises maintaining 1,3-dibutylurea and paraformaldehyde in the proportion of one mol 1,3-dibutylurea to 2.1–3.5 mols of $CH_2O$ groups available in the paraformaldehyde at a temperature within the range of 90–150° C. in the presence of boric acid for a sufficient length of time to effect conversion of the 1,3-dibutylurea and paraformaldehyde to tetrahydro-3,5-dibutyl-4H-1,3,5-oxadiazin-4-one.

9. A process for the production of tetrahydro-3,5-bis(carbethoxymethyl) - 4H - 1,3,5 - oxadiazin - 4 - one which comprises maintaining 1,3-dicarbethoxymethylurea and paraformaldehyde in the proportion of one mol 1,3-dicarbethoxymethylurea to 2.1–3.5 mols of $CH_2O$ groups available in the paraformaldehyde at a temperature within the range of 90–150° C. in the presence of boric acid for a sufficient length of time to effect conversion of the 1,3-dicarbethoxymethylurea and paraformaldehyde to tetrahydro - 3,5 - bis(carbethoxymethyl) - 4H - 1,3,5-oxadiazin-4-one.

10. A process for the production of tetrahydro-3,5-bis(carbomethoxypentyl) - 4H - 1,3,5 - oxadiazin - 4 - one which comprises maintaining 1,3-dicarbomethoxypentylurea and paraformaldehyde in the proportion of one mol 1,3-dicarbomethoxypentylurea to 2.1–3.5 mols of $CH_2O$ groups available in the paraformaldehyde at a temperature within the range of 90–150° C. in the presence of boric acid for a sufficient length of time to effect conversion of the 1,3-dicarbomethoxypentylurea and paraformaldehyde to tetrahydro-3,5-bis(carbomethoxypentyl)-4H-1,3,5-oxadiazin-4-one.

11. A compound of the formula

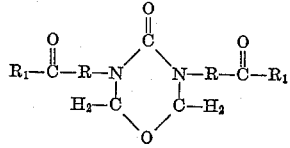

in which R represents an alkyl of 1 to 5 carbon atoms and $R_1$ represents an alkoxy of 1 to 5 carbon atoms.

12. Tetrahydro - 3,5 - bis(carbethoxymethyl) - 4H-1,3,5-oxadiazin-4-one.

13. Tetrahydro - 3,5 - bis(carbomethoxypentyl) - 4H-1,3,5-oxadiazin-4-one.

References Cited in the file of this patent

UNITED STATES PATENTS

| | | |
|---|---|---|
| 2,196,751 | Dickey et al. | Apr. 9, 1940 |
| 2,960,433 | Eden | Nov. 15, 1960 |
| 2,999,047 | Model et al. | Sept. 5, 1961 |
| 3,030,362 | England | Apr. 17, 1962 |
| 3,047,573 | Takahashi et al. | July 31, 1962 |

OTHER REFERENCES

Zigeuner et al.: "Monatsh fur Chemie," vol. 86, pp. 57–8, 165–72, 173–81, 517–23, 524–27 (1955).

Becher et al.: "Chem. Ber.," vol. 91, pp. 2032–9 (1958).

Hall et al.: J.A.C.S., vol. 80, pp. 6409–12 (1958).